United States Patent
Hiar et al.

(10) Patent No.: US 9,213,841 B2
(45) Date of Patent: Dec. 15, 2015

(54) METHOD, MANUFACTURE, AND APPARATUS FOR SECURE DEBUG AND CRASH LOGGING OF OBFUSCATED LIBRARIES

(75) Inventors: Edward Charles Hiar, Lynnwood, WA (US); Rahul Ricardo Frias, Redmond, WA (US); Duncan MacLean, Kirkland, WA (US)

(73) Assignee: GOOGLE INC., Mountain View, CA (US)

( * ) Notice: Subject to any disclaimer, the term of this patent is extended or adjusted under 35 U.S.C. 154(b) by 499 days.

(21) Appl. No.: 13/557,076

(22) Filed: Jul. 24, 2012

(65) Prior Publication Data
US 2014/0032932 A1    Jan. 30, 2014

(51) Int. Cl.
*G06F 11/30*    (2006.01)
*G06F 21/57*    (2013.01)
*G06F 11/36*    (2006.01)

(52) U.S. Cl.
CPC ............ *G06F 21/577* (2013.01); *G06F 11/362* (2013.01); *G06F 2221/2101* (2013.01); *G06F 2221/2107* (2013.01)

(58) Field of Classification Search
CPC .................................................. G06F 12/1408
USPC ......................................................... 713/190
See application file for complete search history.

(56) References Cited

U.S. PATENT DOCUMENTS

| | | | |
|---|---|---|---|
| 6,249,882 B1 * | 6/2001 | Testardi ..................... | 714/38.14 |
| 6,836,881 B2 * | 12/2004 | Beynon et al. ................ | 717/128 |
| 2005/0210275 A1 * | 9/2005 | Homing et al. ............... | 713/190 |
| 2008/0215891 A1 * | 9/2008 | Horne et al. .................. | 713/187 |
| 2009/0119515 A1 * | 5/2009 | Nicolson et al. .............. | 713/190 |
| 2010/0268958 A1 * | 10/2010 | Home et al. .................. | 713/176 |
| 2011/0067012 A1 * | 3/2011 | Eisen et al. ................... | 717/140 |
| 2012/0170740 A1 * | 7/2012 | Lee et al. ........................ | 380/44 |
| 2013/0061210 A1 * | 3/2013 | Chung et al. .................. | 717/125 |

OTHER PUBLICATIONS

S. Cimatto, A. De Santis, U. Ferraro Petrillo, "Overcoming the obfuscation of Java programs by identifier renaming," Jan. 8, 2005, The Journal of Systems and Software 78 (2005) 60-72, pp. 60-72.*
Jesse C. Rabek, et al., "Detection of Injected, Dynamically Generated and Obfuscated Malicious Code," Oct. 27, 2003, pp. 76-82.*

* cited by examiner

*Primary Examiner* — Luu Pham
*Assistant Examiner* — Canh Le
(74) *Attorney, Agent, or Firm* — Fenwick & West LLP

(57) ABSTRACT

A method, apparatus, and manufacture for debugging and crash logging is provided. A log file is received, where the log file includes encrypted log messages that indicate execution trace of obfuscated code while leaving code locations of corresponding code in the obfuscated code unknown. The encrypted log messages include execution way-point indices. Next, at least a portion of the log file is then decrypted. A debug log viewer is then employed to view the decrypted log file. The debug log viewer includes an execution way-point manifest that correlates each of the execution way-point indices to a corresponding code location.

14 Claims, 6 Drawing Sheets

METHOD, MANUFACTURE, AND APPARATUS FOR SECURE DEBUG AND CRASH LOGGING OF OBFUSCATED LIBRARIES

TECHNICAL FIELD

The invention is related to computer software, and in particular, but not exclusively, to a method, manufacture, and apparatus for secure debug and crash logging of obfuscated libraries.

BACKGROUND

To enhance the overall security of a software system, obfuscation technologies may be used in order to eliminate code paths and recognizable function symbols within the library. In non-obfuscated libraries, debug symbols are used to help track down problems within software. When a library is obfuscated, symbols and backtraces are no longer available, enhancing the overall security of the library.

BRIEF DESCRIPTION OF THE DRAWINGS

Non-limiting and non-exhaustive embodiments of the present invention are described with reference to the following drawings, in which.

DETAILED DESCRIPTION

Figure 1:
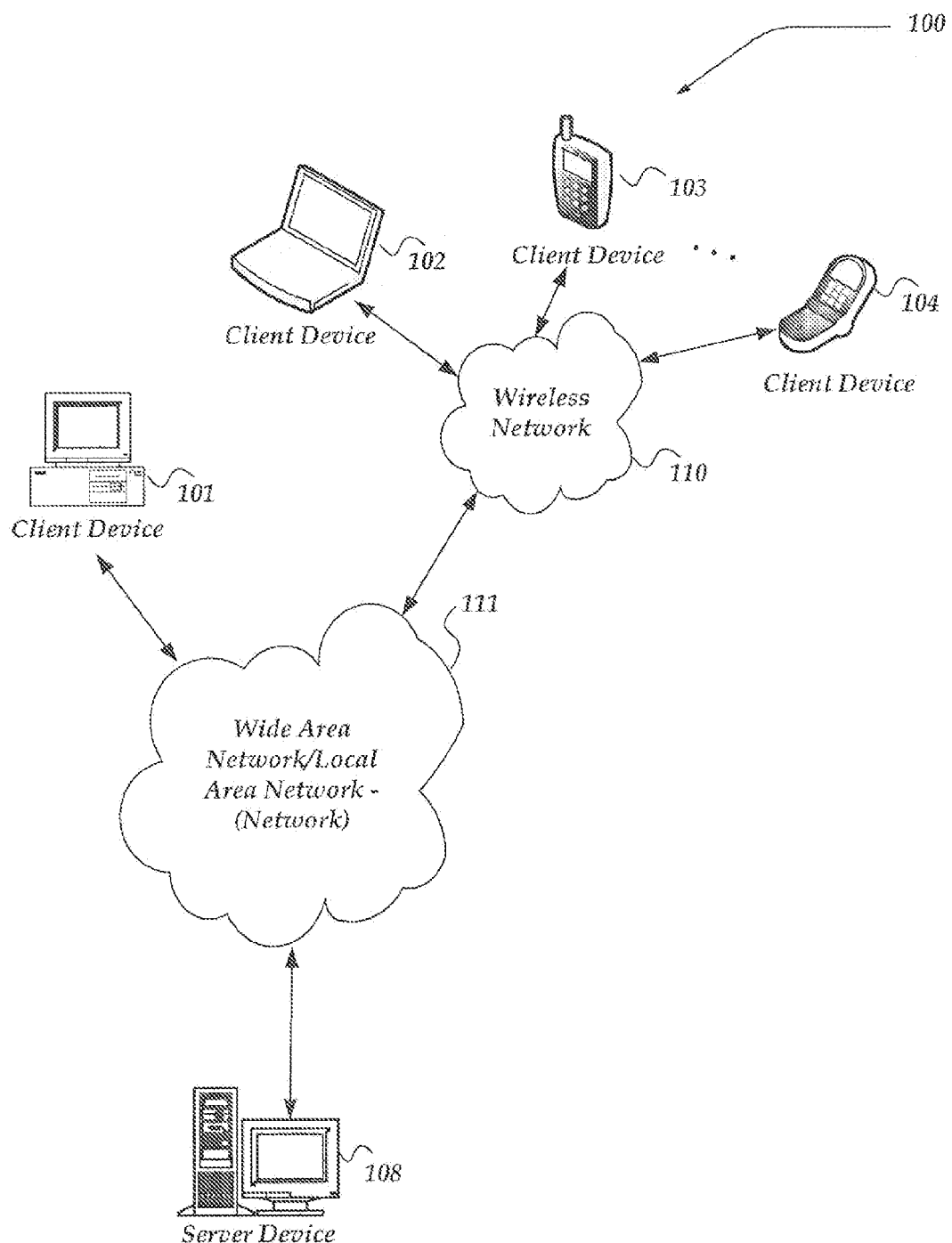
FIG. 1 illustrates a system diagram of one embodiment of an environment in which the embodiments of the invention may be practiced.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" includes plural reference, and the meaning of "in" includes "in" and "on." The phrase "in one embodiment," as used herein does not necessarily refer to the same embodiment, although it may. Similarly, the phrase "in some embodiments," as used herein, when used multiple times, does not necessarily refer to the same embodiments, although it may. As used herein, the term "or" is an inclusive "or" operator, and is equivalent to the term "and/or," unless the context clearly dictates otherwise. The term "based, in part, on", "based, at least in part, on", or "based on" is not exclusive and allows for being based on additional factors not described, unless the context clearly dictates otherwise. The term "coupled" means at least either a direct electrical connection between the items connected, or an indirect connection through one or more passive or active intermediary devices. The term "signal" means at least one current, voltage, charge, temperature, data, or other signal.

Briefly stated, the invention is related to a method, apparatus, and manufacture for debugging and crash logging. A log file is received, where the log file includes encrypted log messages that indicate execution trace of obfuscated code while leaving code locations of corresponding code in the obfuscated code unknown. The encrypted log messages include execution way-point indices. Next, at least a portion of the log file is then decrypted. A debug log viewer is then employed to view the decrypted log file. The debug log viewer includes an execution way-point manifest that correlates each of the execution way-point indices to a corresponding code location.

Illustrative Operating Environment

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes local area networks ("LANs") wide area networks ("WANs")—(network) 111, wireless network 110, client devices 101-104, and server device 108.

One embodiment of client devices 101-104 is described in more detail below in conjunction with FIG. 2. Generally, however, client devices 102-104 may include virtually any portable computing device capable of receiving and sending a message over a network, such as wireless network 110, or the like. Client devices 102-104 may also be described generally as client devices that are configured to be portable. Thus, client devices 102-104 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like. As such, client devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and several lines of color LCD display in which both text and graphics may be displayed.

Client device 101 may include virtually any computing device capable of communicating over a network to send and receive information. The set of such devices may include devices that typically connect using a wired or wireless communications medium such as personal computers, multiprocessor systems, microprocessor-based or programmable consumer electronics, network PCs, or the like. In one embodiment, at least some of client devices 102-104 may operate over wired and/or wireless network.

A web-enabled client device may include a browser application that is configured to receive and to send web pages, web-based messages, and the like. The browser application may be configured to receive and display graphics, text, multimedia, and the like, employing virtually any web-based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message. In one embodiment, a user of the client device may employ the browser application to perform various activities over a network (online). However, another application may also be used to perform various online activities.

Wireless network 110 is configured to couple client devices 102-104 and its components with network 111. Wireless network 110 contains at least one Access Point (not shown in FIG. 1). Wireless network 110 may include any of a variety of wireless sub-networks that may further overlay stand-alone ad-hoc networks, and the like. Such sub-networks may include mesh networks, Wireless LAN (WLAN) networks, cellular networks, and the like.

Wireless network 110 may further include an autonomous system of terminals, gateways, routers, and the like connected by wireless radio, links, and the like. These connectors may be configured to move freely and randomly and organize themselves arbitrarily, such that the topology of wireless network 110 may change rapidly.

Wireless network 110 may further employ a plurality of access technologies including $2^{nd}$ (2G), $3^{rd}$ (3G), $4^{th}$ (4B), $5^{th}$ (5G) generation radio access for cellular systems, WLAN, Wireless Router (WR) mesh, and the like. Access technologies such as 2G, 3G, 4G, and future access networks may enable wide area coverage for mobile devices, such as client devices 102-104 with various degrees of mobility. For example, wireless network 110 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like.

Network 111 is configured to couple network devices with other computing devices, and through wireless network 110 to client devices 102-104. Network 111 is enabled to employ any form of computer readable media for communicating information from one electronic device to another. Also, network 111 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 111 includes any communication method by which information may travel between computing devices.

Additionally, communication media typically embodies computer-readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

Server device 108 is a network device. Devices that may operate as server 108 include various network devices, including, but not limited to personal computers, desktop computers, multiprocessor systems, microprocessor-based or programmable consumer electronics, network PCs, server devices, network appliances, and the like. It should be noted that while various devices are shown in a particular quantity, for example, server 108 is shown as two devices, in various embodiments there may a different quantity of such devices, such two or more servers. Thus, the invention is not to be construed as being limited to a single environment and other configurations, and architectures are also envisaged.

Illustrative Client Device

Figure 2:
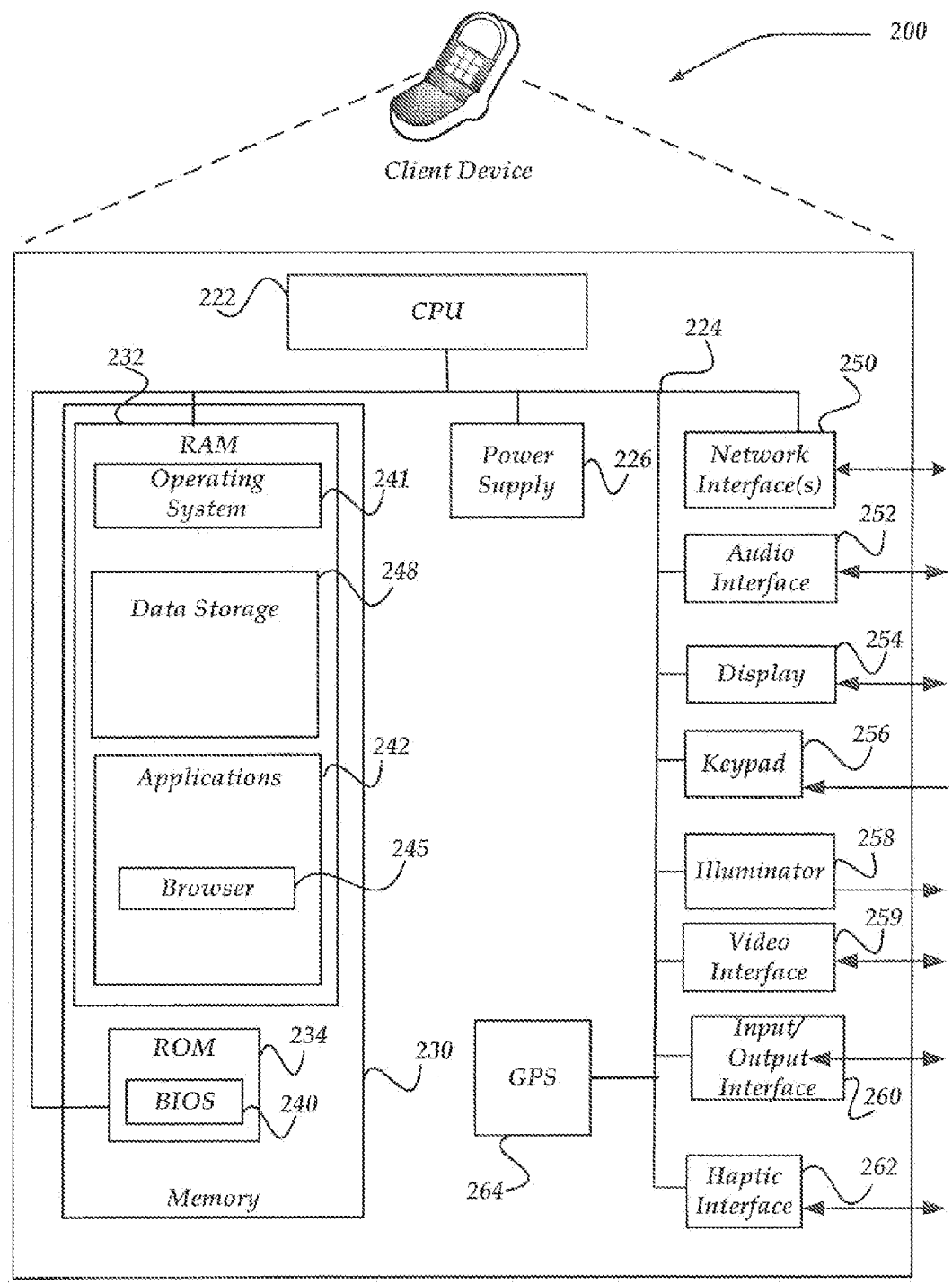
FIG. 2 shows one embodiment of a client device that may be included in the system of FIG. 1.

FIG. 2 shows one embodiment of client device 200 that may be included in a system implementing the invention. Client device 200 may include many more or less components than those shown in FIG. 2. However, the components shown are sufficient to disclose an illustrative embodiment for practicing the present invention. Client device 200 may represent, for example, one embodiment of at least one of client devices 101-104 of FIG. 1.

As shown in the figure, client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, and an optional global positioning systems (GPS) receiver 264. Power supply 226 provides power to client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling client device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, Such as USB, infrared, Bluetooth™, or the like. Haptic interface 262 is arranged to provide tactile feedback to a user of the client device. For example, the haptic interface may be employed to vibrate client device 200 in a particular way when another user of a computing device is calling.

Optional GPS transceiver 264 can determine the physical coordinates of client Device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of client device 200 on the surface of the Earth. It is understood that under different conditions, GPS transceiver 264 can determine a physical location within millimeters for client device 200; and in other cases, the determined physical location may be less precise, such as within a meter or significantly greater distances. In one embodiment, however, mobile device may through other components, provide other information that may be employed to determine a physical location of the device, including for example, a MAC address, IP address, or the like.

Mass memory 230 includes a RAM 232, a ROM 234, and other storage means. Mass memory 230 illustrates an example of computer readable storage media (devices) for storage of information such as computer readable instructions, data structures, program modules or other data. Mass memory 230 stores a basic input/output system ("BIOS") 240 for controlling low-level operation of client device 200. The mass memory also stores an operating system 241 for controlling the operation of client device 200. It will be appreciated that this component may include a general-purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Memory 230 further includes one or more data storage 248, which can be utilized by client device 200 to store, among other things, applications 242 and/or other data. Applications 242 may include computer executable instructions which, when executed by client device 200, perform actions. Other examples of application programs include calendars, search programs, email clients, IM applications, SMS applications, VOIP applications, contact managers, task managers, transcoders, database programs, word processing programs, security applications, spreadsheet programs, games, search programs, and so forth. Further, as discussed in greater detail below, in some embodiments, applications 242 may include a browser plug in for playing protected premium video content.

Illustrative Network Device

Figure 3:
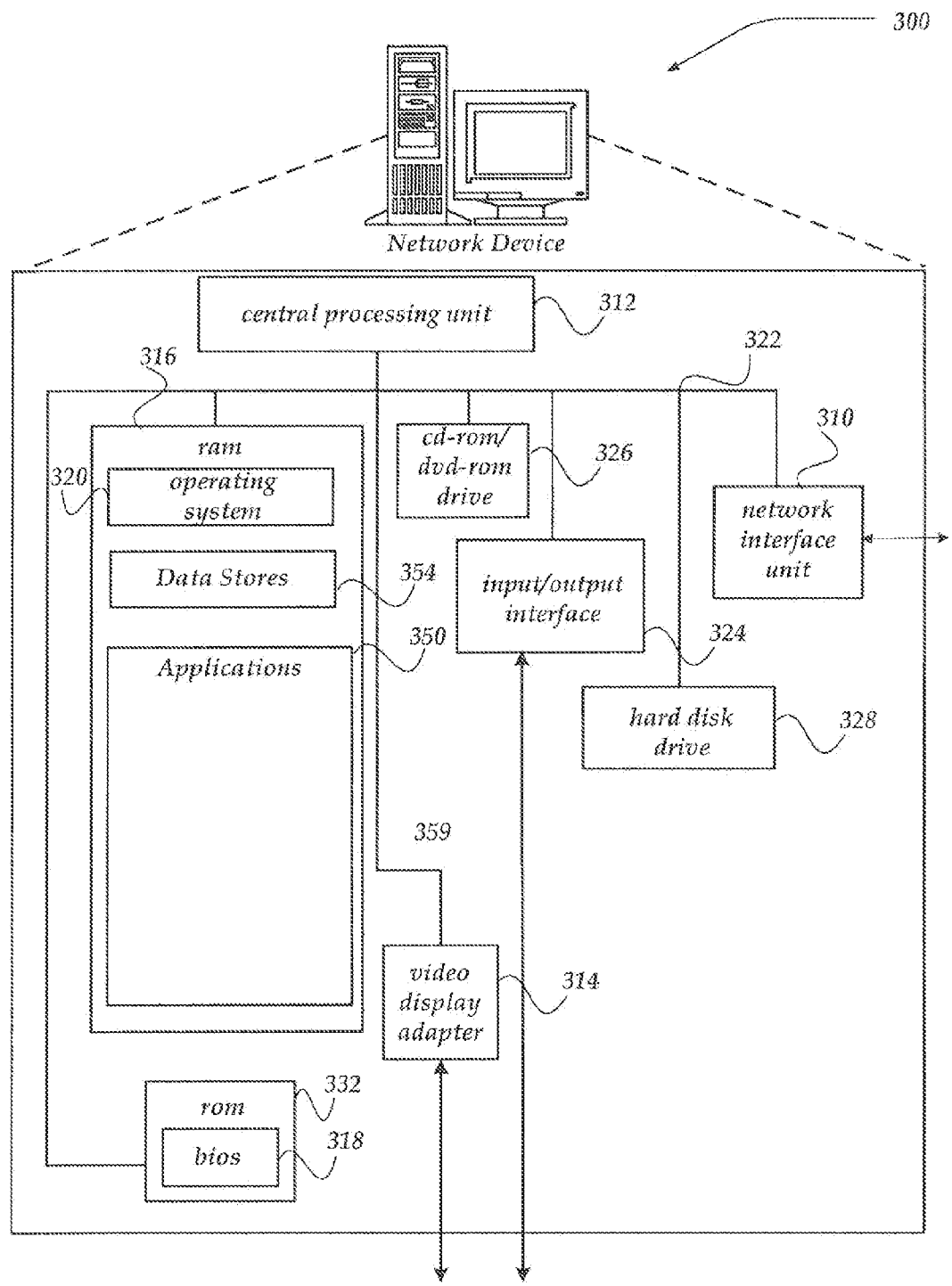
FIG. 3 shows one embodiment of a network device that may be included in the system of FIG. 1.

FIG. 3 shows one embodiment of a network device 300, according to one embodiment of the invention. Network device 300 may include many more or less components than those shown. The components shown, however, are sufficient to disclose an illustrative embodiment for practicing the invention. Network device 300 may represent, for example, server 108 of FIG. 1.

Network device 300 may include processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory may store operating system 320 for controlling the operation of network device 300. Any general-purpose operating system may be employed. Basic input/output system ("BIOS") 318 may also be provided for controlling the low-level operation of network device 300. As illustrated in FIG. 3, network device 300 also can communicate with the Internet, or some other communications network, via network interface unit 310, which may be constructed for use with various communication protocols including the TCP/IP protocol. Network interface unit 310 is sometimes known as a transceiver, transceiving device, or network interface-card (NIC).

The mass memory as described above illustrates another type of computer-readable/processor-readable media, namely computer-readable storage media. Computer-readable storage media (devices) may include volatile, nonvolatile, removable, and non-removable media implemented in any method or technology for storage of information, such as computer readable instructions, data structures, program modules, or other data. Examples of computer-readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other physical medium which can be used to store the desired information and which can be accessed by a computing device.

Data stores 354 may include a database, text, spreadsheet, folder, file, or the like. Data stores 354 may further include program code, data, algorithms, and the like, for use by a processor, such as central processing unit (CPU) 312 to execute and perform actions. In one embodiment, at least some of data and/or instructions stored in data stores 354 might also be stored on another device of network device 300, including, but not limited to cd-rom/dvd-rom 326, hard disk drive 328, or other computer-readable storage device resident on network device 300 or accessible by network device 300 over, for example, network interface unit 310.

The mass memory also stores program code and data. One or more applications 350 may be loaded into mass memory and run on operating system 320. Examples of application programs may include transcoders, schedulers, calendars, database programs, word processing programs, Hypertext Transfer Protocol (HTTP) programs, customizable user interface programs, IPSec applications, encryption programs, authentication programs, security programs, SMS message servers, IM message servers, email servers, account managers, and so forth.

Various embodiments of network device 300 may include further applications 350 to perform various functions discussed herein and/or discussed with regard to some of the steps as illustrated in the flowcharts shown below. These stored applications are processor-executable code encoded on a processor-readable medium, which, when executed by CPU 312, enable actions to performed in accordance with the processor-executable code.

Although various embodiments have discussed the performed of actions implemented in software, for example by means of processor-executable code encoded on a processor-readable medium, which, when executed by CPU 312, enable actions to performed in accordance with the processor-executable code, in various embodiments, actions, may in some embodiments, rather than being performed only by executed software, may instead be performed based on hardware only, or by a combination of hardware and software.

Generalized Operation

The operation of certain aspects of the invention will now be described with respect to FIGS. 4-6.

Figure 4:
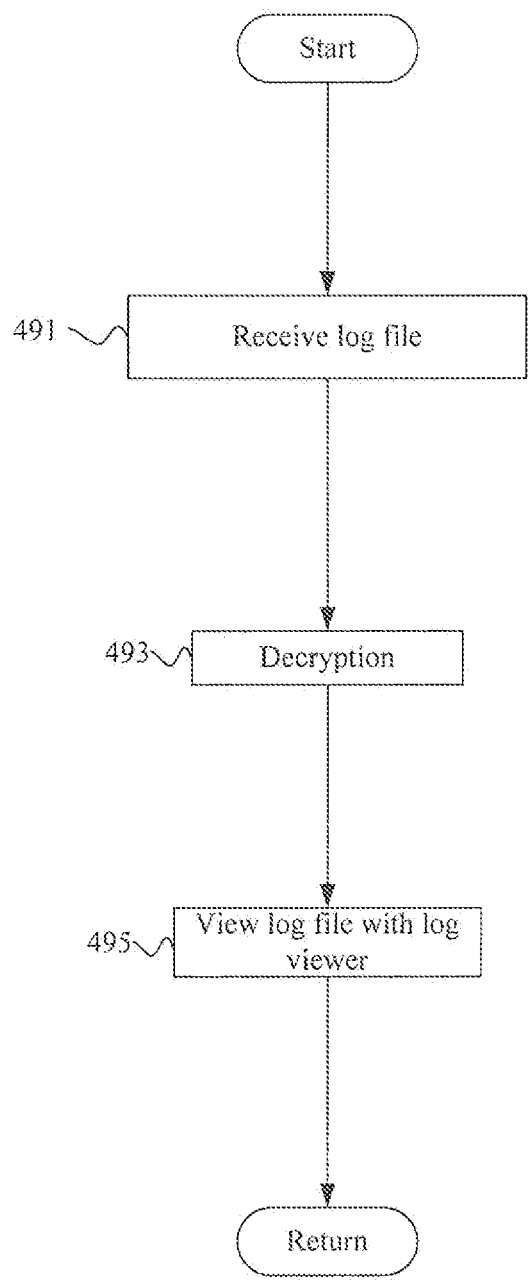
FIG. 4 shows a flowchart of an embodiment of a process.

FIG. 4 illustrates a flow chart of an embodiment of process 470. After a start block, the process proceeds to block 491, where a log file is received, in which the received log file includes encrypted log messages that indicate execution trace of obfuscated code while leaving code locations of corresponding code in the obfuscated code unknown. The encrypted log messages include execution way-point indices. The process then advances to block 493, where at least a portion the log file is decrypted, for example, encrypted messages in the log file may be decrypted. The process then moves to block 495, where a debug log viewer is employed to view the decrypted log file. The debug log viewer includes an execution way-point manifest that correlates each of the execution way-point indices to a corresponding code location. The process then proceeds to a return block, where other processing is resumed. The actions at blocks 491, 493, and 495 may be performed by a server such as server 108 of FIG. 1 in some embodiments. The log file may be received from a client device in some embodiments.

Figure 5:
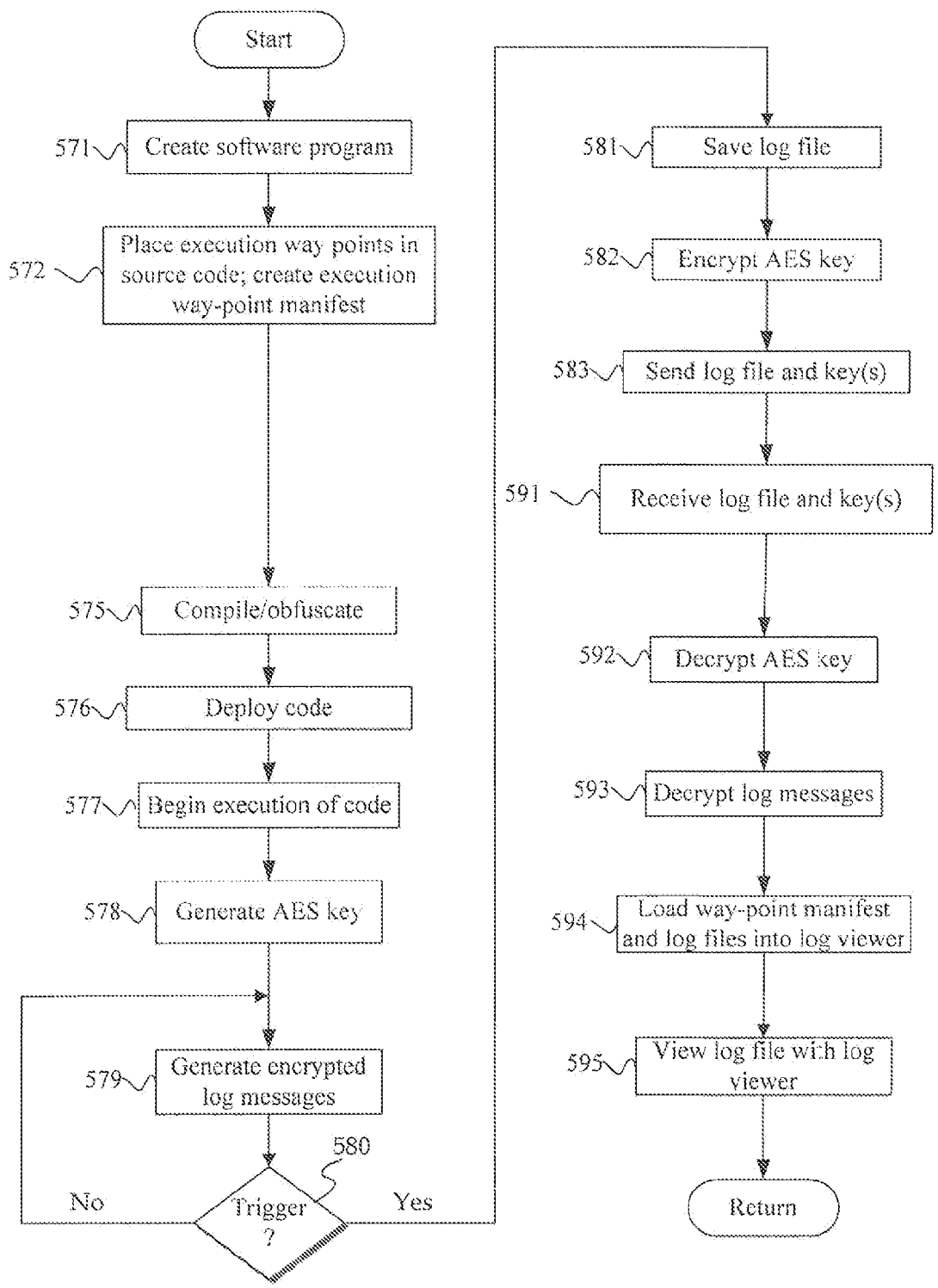
FIG. 5 illustrates a flowchart of an embodiment of the process of FIG. 4.

FIG. 5 illustrates a flowchart of an embodiment of process 570, which may be employed as an embodiment of process 470 of FIG. 4 in which public/private key pair encryption of the log messages is employed. After a start block, the process proceeds to block 571, where a software program is created by a developer. The process then advances to block 572, where execution way-points are placed in the source code of the software program by the developer. For example, in some embodiments, the execution way-points may be entry and exit macros. Each execution way-point has a corresponding execution way-point index, which may be a non-descript string, or the like. The execution way-point itself gives no indication of the code location of the execution-waypoint. Also, an execution way-point manifest is created at block 572. The execution way-point manifest contains information such as the source file name and location within the source file where the execution way points were laid. The execution way-point manifest ties each of the execution way point indices to a location to the actual source. The client does not have access to the execution way-point manifest. The process then moves to block 575, where the software program is compiled and obfuscated. In some embodiments, the code is first complied and then obfuscated, and in other embodiments the code is first obfuscated and then complied. In some embodiments, the obfuscation is accomplished by use of one or more obfuscation tools. The obfuscation removes all of the symbols that are normally used to trace the execution path in the software code, the code path is changed, and standard debugging methods are masked as a result of the obfuscation.

The process then proceeds to block 576, where the code is deployed by providing the code to a client. The process then advances to block 577, where execution of the code begins. The process then moves to block 578, where, during execution of the code, a symmetric key is generated, such as an Advanced Encryption Standard (AES) key in some embodiments. The process then proceeds to block 579, where encrypted log messages are generated. During execution, the execution way points become part of the code path providing a trace of execution when they are written to log messages. During execution, the execution-way points generate trace data, but there is no indication as to the code locations of the trace generated trace data. The log messages are then encrypted using the symmetric key. The log messages do not indicate where the code is in the execution path; the log messages simply use execution-way point indices that are non-descript strings that do not indicate where the code is in the execution path.

The process then moves to decision block 580, where a determination is made as to whether or not a triggering-event has occurred. If not, the process returns to block 579, where execution of the code continues, and encrypted log messages are generated by the execution way-points as the code is executed.

If at decision block 580 it is determined that a triggering event, such as a program crash in some embodiments, has occurred, then the process advances to block 581, where the encrypted log messages are saved in a log file. For example, in some embodiments, the log file is saved by crash log facilities. The process then proceeds to block 582, where the symmetric key is encrypted using a public key supplied within the software library. Block 582 may be done in a different time than indicated here; for example, in some embodiments, the symmetric key is encrypted immediately after the symmetric key is generated.

The process then moves to block 583, where the log file and the encrypted symmetric key are sent to a technician, such as at server 108 of FIG. 1 in some embodiments. The technician obtains the private key by other means. The process then proceeds to block 591, where the log file and encrypted symmetric key are received (e.g., by server 108). The process then moves to block 592, where the encrypted symmetric key is decrypted using the private key of the public-private key pair. The process then advances to block 593, where the at least a portion of the log file is decrypted using the decrypted symmetric key. The process then proceeds to block 594, where the execution way-point manifest and log files are loaded into the debug log viewer. The process then moves to block 595, where the debug log viewer is employed to view the decrypted log file. In some embodiments, the log view application on the debug log viewer performs the actions of blocks 591-595. The execution way-point manifest includes a list of execution way-point indices and corresponding code locations. The function locations within the function library may accordingly be identified. The technician can use the debug log viewer to see where the crash happened based on where the trace stops. The process then proceeds to a return block, where other processing is resumed.

With process 570, it might be possible for a user or "hacker" to view the symmetric cryptography key while the encryption of the log messages is being performed and be able to get the key and use it to decrypt the log entries. Instead of using public-private key cryptography to encrypt the generated symmetric key, white-box cryptography may be employed, as discussed below in one embodiment in conjunction with FIG. 6. White-box cryptography is used to protect the generated symmetric key in environments in which malicious users can view, modify, delete, and insert into the code and data of program at will, both dynamically and statically.

Figure 6:
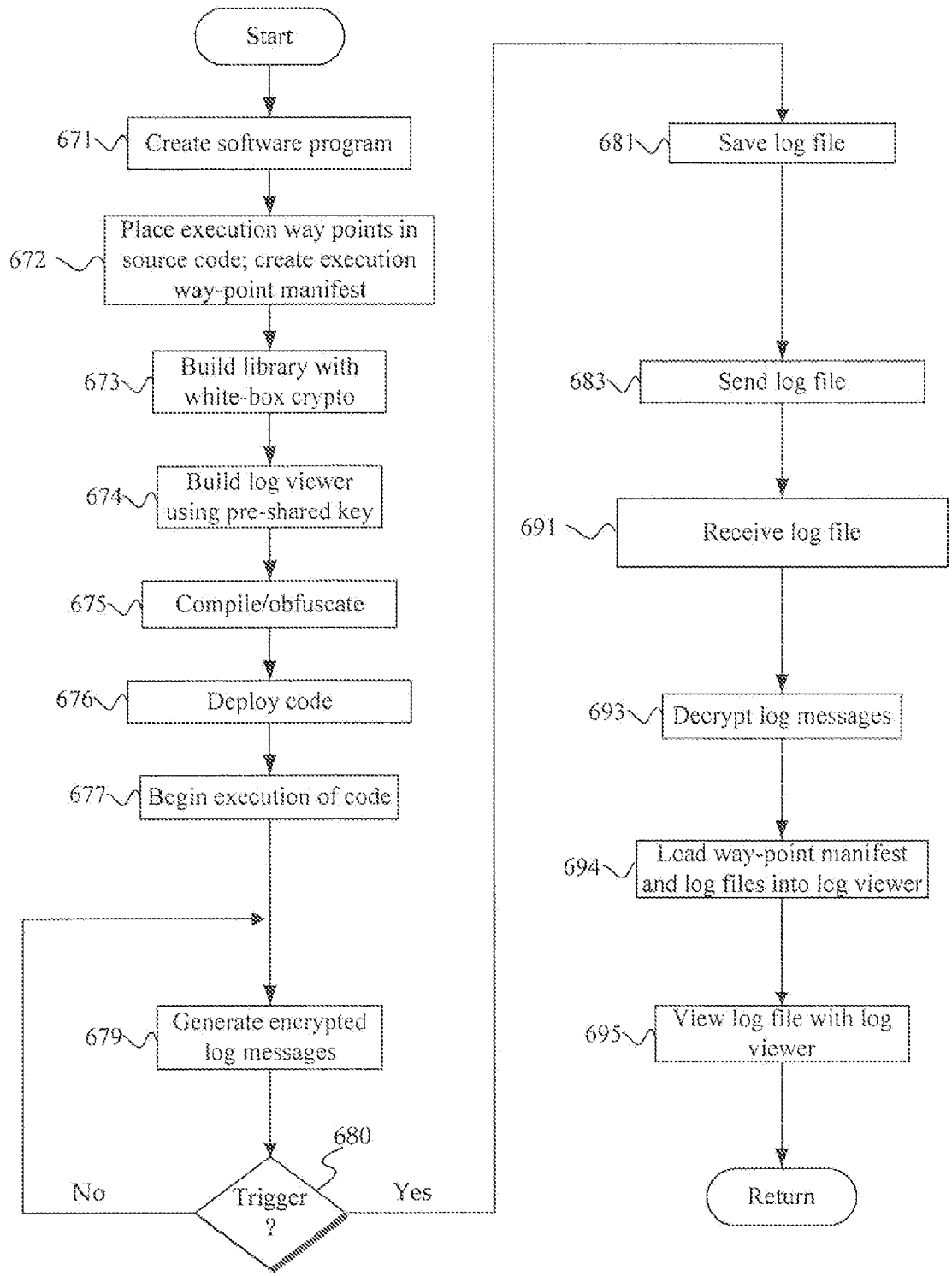
FIG. 6 shows a flowchart of another embodiment of the process of FIG. 4, in accordance with aspects of the invention.

FIG. 6 illustrates a flowchart of an embodiment of process 670, which may be employed as an embodiment of process 470 of FIG. 4 in which a pre-shared key with white-box cryptography is employed. After a start block, the process proceeds to block 671, where a software program is created by a developer. The process then advances to Block 672, where execution way-points are placed in the source code of the software program by the developer. Also, an execution way-point manifest is created. The execution way-point manifest contains information such as the source file name and location within the source file where the execution way points were laid. The execution way-point manifests ties the execution way point index for a location to the actual source. The process then proceeds to block 673, where the library is built using white-box cryptography, such as AES white-box cryptography in some embodiments. That is, the library is built to include white-box cryptography module(s) that will subsequently be used to cause the log messages to be encrypted during execution. The process then advances to block 674, where a log viewer is built employing the white-box cryptography pre-shared key. The process then moves to block 675, where the software program is compiled and obfuscated. In some embodiments, the code is first complied and then obfuscated, and in other embodiments the code is first obfuscated and then complied. In some embodiments, the obfuscation is accomplished by use of one or more obfuscation tools. The obfuscation removes all of the symbols that are normally used to trace the execution path in the software code, the code path is changed, and standard debugging methods are masked as a result of the obfuscation.

The process then proceeds to block 676, where the code is deployed by providing the code to a client. The process then advances to block 677, where execution of the code begins. The process then proceeds to block 679, where encrypted log messages are generated. During execution, the execution way-points become part of the code path providing a trace of execution when they are written to log messages. During execution, the execution-way points generate trace, data, but there is no indication as to the code locations of the trace generated trace data. The log message encryption is accomplished using a pre-shared key with white-box cryptography.

The process then moves to decision block 680, where a determination is made as to whether or not a triggering event has occurred. If not, the process returns to block 679, where execution of the code continued, and encrypted log messages are generated by the execution way-points as the code is executed.

If at decision block 680 a determination is made that a triggering event, such as a program crash in some embodiments, has occurred, then the process advances to block 681, where the encrypted log messages are saved in a log file. For example, in some embodiments, the log file is saved by crash log facilities. The process then moves to block 683, where the log file is sent to a technician, such as at server 108 of FIG. 1 in some embodiments. The process then proceeds to block 691, where the log file is received (e.g., by server 108). The process then advances to block 693, where at least a portion of the log file is decrypted using the pre-shared private key. The decryption performed at block 693 is performed by a debug log viewer in some embodiments. The process then proceeds to block 694, where the way-point manifest and log files are loaded into the log viewer. The process then moves to block 695, where the log viewer is employed to view the decrypted log file. The execution way-point manifest includes a list of execution way-point indices and corresponding code locations. The function locations within the function library may accordingly be identified. The technician can use the log viewer to see where the crash happened based on where the trace stops. The process then proceeds to a return block, where other processing is resumed.

In some embodiments, an embodiment of a method such as that of FIG. 4, FIG. 5, or FIG. 6 may be employed in obfuscated digital rights management (DRM) products, obfuscated video optimization plugins, and similar software products that protect premium video content or other critical private data. In some embodiments, the software may be security software that protects premium video content delivered over the internet, by encrypting the source file on a server side, decrypting the source file on the client side, and requesting a license with the equivalent of a decryption key, and providing the file to a renderer after decryption is performed. In some embodiments, the software may be a client plug in within a browser so that DRM-protected video content may be viewed in the browser. The obfuscation provides protection by preventing unauthorized parties from performing reverse engineering and determining how to decrypt the key to decrypt and steal protected content. The video content or other private data is protected by use of obfuscation, but software programs may still be de-bugged by authorized parties using a method such as that discussed with regard to FIG. 4, FIG. 5, or FIG. 6. However, the invention is not so limited, and may be used any application in which obfuscated libraries and/or the like are employed—in this way, authorized parties may troubleshoot defects and crashes and perform logging in spite of the obfuscation.

The above specification, examples, and data provide a description of the manufacture and use of the composition of the invention. Since many embodiments of the invention can be made without departing from the spirit and scope of the invention, the invention also resides in the claims hereinafter appended.

What is claimed is:
1. A method, comprising:
    executing obfuscated code having execution way-points placed at locations in the obfuscated code that are configured to generate log messages during execution of the obfuscated code locations, the log messages including execution way-point indices that give no indication of the code locations and indicating an execution trace of the obfuscated code;
    during execution of the obfuscated code, generating encrypted log messages;
    saving a log file including the encrypted log messages upon occurrence of a trigger event, wherein the trigger event is a program crash;
    receiving the log file that includes the encrypted log messages;
    decrypting at least a portion of the log file; and
    employing a debug log viewer to view the decrypted log file, the employing comprising:
        correlating ones of the execution way-point indices with corresponding code locations in the obfuscated code using an execution way-point manifest; and
        identifying, responsive to the correlating, code locations executed during the execution trace.
2. The method of claim 1, further comprising:
    building the execution way-points into source code;
    generating the execution way-point manifest; and
    generating the code by compiling and obfuscating the source code.
3. The method of claim 1, wherein the encrypted log messages are encrypted via white-box cryptography employing a pre-shared private key.

4. The method of claim 1, further comprising:
generating a symmetric key during the execution of the code, wherein generating the encrypted log messages includes generating log messages and encrypting the log messages with the symmetric key;
encrypting the symmetric key with a public key employing public-private key cryptography; and
sending the log file and the encrypted symmetric key.

5. The method of claim 4, further comprising
receiving the encrypted symmetric key; and
decrypting the encrypted symmetric key, wherein the decrypted symmetric key is employed to decrypt the at least the portion of the log file.

6. The method of claim 4, wherein the symmetric key is an Advanced Encryption Standard (AES) key.

7. A device, comprising:
a memory that is configured to store processor-executable instructions; and
a processor that is configured to execute the processor-executable instructions to enable actions, including:
executing obfuscated code having execution way-points placed at locations in the obfuscated code that are configured to generate log messages during execution of the obfuscated code locations, the log messages including execution way-point indices that give no indication of the code locations and indicating an execution trace of the obfuscated code;
during execution of the obfuscated code, generating encrypted log messages;
saving a log file including the encrypted log messages upon occurrence of a trigger event, wherein the trigger event is a program crash;
receiving the log file that includes the encrypted log messages;
decrypting at least a portion of the log file; and
employing a debug log viewer to view the decrypted log file, the employing comprising:
correlating ones of the execution way-point indices with corresponding code locations in the obfuscated code using an execution way-point manifest; and
identifying, responsive to the correlating, code locations executed during the execution trace.

8. A manufacture, including a tangible non-transitory processor-readable storage medium having processor-executable code encoded therein, which when executed by one or more processors, enables actions, comprising:
executing obfuscated code having execution way-points placed at locations in the obfuscated code that are configured to generate log messages during execution of the obfuscated code locations, the log messages including execution way-point indices that give no indication of the code locations and indicating an execution trace of the obfuscated code;
during execution of the obfuscated code, generating encrypted log messages; saving a log file including the encrypted log messages upon occurrence of a trigger event, wherein the trigger event is a program crash;
receiving the log file that includes the encrypted log messages;
decrypting at least a portion of the log file; and
employing a debug log viewer to view the decrypted log file, the employing comprising:
correlating ones of the execution way-point indices with corresponding code locations in the obfuscated code using an execution way-point manifest; and
identifying, responsive to the correlating, code locations executed during the execution trace.

9. A system, comprising:
a client device that is configured to perform actions, including:
executing code;
during execution of the code, generating encrypted log messages responsive to execution of execution way-points placed at locations in the code that are configured to generate log messages including execution way-point indices that give no indication of the code locations during execution of the code locations, the encrypted log messages further indicating an execution trace of the code; and
saving a log file including the encrypted log messages upon occurrence of a trigger event, wherein the trigger event is a program crash; and
a server device that is configured to perform actions, including:
receiving the log file;
decrypting at least a portion of the log file; and
employing a debug log viewer to view the decrypted log file, the employing comprising:
correlating ones of the execution way-point indices with corresponding code locations in the code using an execution way-point manifest; and
identifying, responsive to the correlating, code locations executed during the execution trace.

10. The system of claim 9, wherein the server device is configured to perform further actions, including:
generating the code by compiling and obfuscating source code.

11. The system of claim 9, wherein the client device is configured such that the encrypted log messages are encrypted via white-box cryptography employing a pre-shared private key.

12. The system of claim 9, wherein the client device is configured to provide further actions, including:
generating a symmetric key during the execution of the code, wherein generating the encrypted log messages includes generating log messages and encrypting the log messages with the symmetric key;
encrypting the symmetric key with a public key employing public-private key cryptography; and
sending the log file and the encrypted symmetric key.

13. The system of claim 12, wherein the server device configured to perform further actions, including:
receiving the encrypted symmetric key; and
decrypting the encrypted symmetric key, wherein the decrypted symmetric key is employed to decrypt the log file.

14. The system of claim 12, wherein the symmetric key is an Advanced Encryption Standard (AES) key.

* * * * *